United States Patent
Marzetta et al.

(10) Patent No.: US 9,768,983 B2
(45) Date of Patent: Sep. 19, 2017

(54) FREQUENCY DIVISION DUPLEX (FDD) MASSIVE MIMO BACKHAUL FOR REPEATER SMALL CELLS

(71) Applicants: Thomas Marzetta, Summit, NJ (US); Oliver Blume, Stuttgart (DE); Pawel Rulikowski, Dublin (IE); Simone Maier, Stuttgart (DE); Andreas Pascht, Rudersberg (DE); Thierry Klein, Fanwood, NJ (US)

(72) Inventors: Thomas Marzetta, Summit, NJ (US); Oliver Blume, Stuttgart (DE); Pawel Rulikowski, Dublin (IE); Simone Maier, Stuttgart (DE); Andreas Pascht, Rudersberg (DE); Thierry Klein, Fanwood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 159 days.

(21) Appl. No.: 14/539,396

(22) Filed: Nov. 12, 2014

(65) Prior Publication Data
US 2016/0134438 A1   May 12, 2016

(51) Int. Cl.
*H04L 12/28*  (2006.01)
*H04L 25/02*  (2006.01)
*H04L 5/00*   (2006.01)

(52) U.S. Cl.
CPC ........ *H04L 25/0228* (2013.01); *H04L 5/0048* (2013.01); *H04L 25/0204* (2013.01)

(58) Field of Classification Search
CPC . H04W 16/28; H04W 72/0453; H04W 16/10; H04W 24/02; H04W 24/10; H04W 84/045; H04B 7/0452; H04B 7/0617; H04B 7/024; H04B 7/0404; H04B 7/0413;
(Continued)

(56) References Cited

U.S. PATENT DOCUMENTS

| 2011/0211467 A1 | 9/2011 | Bhat |
| 2013/0070621 A1* | 3/2013 | Marzetta ................ H04B 7/024 370/252 |

(Continued)

FOREIGN PATENT DOCUMENTS

EP   2 830 382 A1   1/2015

*Primary Examiner* — Wei Zhao
*Assistant Examiner* — Lionel Preval
(74) *Attorney, Agent, or Firm* — Harness, Dickey & Pierce, P.L.C.

(57) ABSTRACT

In a method for transmitting data through a Massive MIMO backhaul system, a central node of the MIMO backhaul system transmits, to a small cell repeater terminal on the downlink, a downlink pilot signal carrying a set of pilot sequences that are mutually orthogonal in the frequency domain. Each pilot sequence in the set of pilot sequences corresponds to an antenna of an antenna array at the central node. The central node receives an uplink pilot signal carrying the set of pilot sequences transmitted by the small cell repeater terminal on the uplink, where the received uplink pilot signal is a frequency converted retransmission of the downlink pilot signal. The central node estimates at least one of an uplink channel and a downlink channel between the central node and the small cell repeater terminal based on the set of pilot sequences and the received uplink pilot signal.

21 Claims, 4 Drawing Sheets (58) Field of Classification Search
CPC .. H04B 7/0456; H04B 7/0469; H04B 7/0691; H04L 25/0202; H04L 25/0228; H04L 5/0048
USPC ................................ 370/252, 254, 267, 315
IPC ........................ H04L 25/0228,25/0204, 5/0048
See application file for complete search history.

(56) References Cited

U.S. PATENT DOCUMENTS

2014/0307814 A1* 10/2014 Jalloul ................. H04B 7/0413
 375/267
2015/0249972 A1* 9/2015 You ......................... H04L 5/001
 370/254

* cited by examiner

FREQUENCY DIVISION DUPLEX (FDD) MASSIVE MIMO BACKHAUL FOR REPEATER SMALL CELLS

BACKGROUND

Small cells are thought by many to be a promising component of future $5^{th}$ Generation (5G) wireless systems. However, the potential of small cells can only be realized if installation costs can be controlled.

Two essential requirements for a small cell installation are electrical power and backhaul, which when provided by wired connections are often costly. A wired connection for electrical power may be eliminated by charging storage batteries using power derived from, for example, a small wind turbine and/or solar panel, while minimizing internal power consumption. The wired backhaul connection may be eliminated by using a wireless backhaul.

A relay cell has been proposed to reduce internal power consumption at a small cell. On the downlink, the relay cell receives a complex-valued analog baseband signal on a carrier frequency from a backhaul link and retransmits the baseband signal at an access carrier frequency that accommodates one or more users attached to the relay cell. On the uplink, the relay cell receives combined transmitted signals from one or more users on an access link, and retransmits the combined baseband signals on the backhaul uplink. This type of relay cell is designed for relatively low-power operation.

Conventional wireless backhaul connections may be provided either by radio frequencies between about 0.8 to 6.0 GHz (e.g., Wi-Fi) or by millimeter-wave technology. While both of these technologies may be practical under certain operating conditions, each also has limitations. For radio frequencies between about 0.8 to 6.0 GHz, under non line-of-sight conditions, the required radiated power for the uplink increases approximately 10 decibels (dB) for every doubling of range (with an assumed loss-exponent of about 3.5). This limits the operating range of backhaul connections using these frequency bands, and hence the flexibility of small cell deployment using this technology. Millimeter-wave backhaul connections take advantage of physically small high-gain dish antennas to compensate for range-induced attenuation loss. However, millimeter-wave links are generally limited to line-of-sight propagation and require relatively tight alignment of antennas, which again limits the flexibility of deployment. Moreover, millimeter-wave links are not considered "all-weather".

SUMMARY

At least some example embodiments provide a form of Massive MIMO (also referred to as "Large-Scale Antenna Systems") for wireless backhaul connections between relay cells (also referred to as "repeater-type small cells", "repeater small cells", etc.) and a backhaul network. A single Massive MIMO base station may provide simultaneous and/or concurrent backhaul connections to a plurality of relay cells by virtue of its spectral efficiency.

At least some example embodiments provide a frequency-division duplex (FDD) Massive MIMO backhaul link for a multiplicity of "all-analog" relay cells.

Having a disproportionately greater number of service antennas in the Massive MIMO array relative to relay cells (e.g., in at least a four-to-one (4:1) ratio of antennas to relay cells) lends relatively high simplicity and robustness to the pre-coding and decoding at the central node.

One or more example embodiments also provide relay cells with wireless backhaul links. One or more example embodiments discussed herein solve an incompatibility problem between prior art repeater small cells and prior art point-to-multipoint backhaul connections.

At least one example embodiment provides a method for channel estimation in a massive multiple-input-multiple-output (MIMO) backhaul system. According to at least this example embodiment, the method includes: transmitting, by a central node of the MIMO backhaul system to a small cell repeater terminal on the downlink, a downlink pilot signal carrying a set of pilot sequences that are mutually orthogonal in the frequency domain, each pilot sequence in the set of pilot sequences corresponding to an antenna of an antenna array at the central node; receiving, at the central node, an uplink pilot signal carrying the set of pilot sequences transmitted by the small cell repeater terminal on the uplink, the received uplink pilot signal being a frequency converted retransmission of the downlink pilot signal; and estimating at least one of an uplink channel and a downlink channel between the central node and the small cell repeater terminal based on the set of pilot sequences and the received uplink pilot signal.

At least one other example embodiment provides a method for transmitting data in a massive multiple-input-multiple-output (MIMO) backhaul system. According to at least this example embodiment, the method includes: entering a training mode in response to a trigger signal received from a central node of the massive MIMO backhaul system on a downlink control channel; receiving, at a small cell repeater terminal from the central node of the massive MIMO backhaul system, a downlink pilot signal carrying a set of pilot sequences that are mutually orthogonal in the frequency domain, each pilot sequence in the set of pilot sequences corresponding to an antenna of an antenna array at the central node; frequency converting the received downlink pilot signal to generate an uplink pilot signal carrying the set of pilot sequences; and transmitting, to the central node of the massive MIMO backhaul system, the uplink pilot signal carrying the set of pilot sequences on the uplink.

At least one other example embodiment provides a Massive multiple-input-multiple-output (MIMO) central node. According to at least this example embodiment, the central node includes a Massive MIMO antenna array and a measurement extraction circuit. The Massive MIMO antenna array is configured to: transmit, to a small cell repeater terminal on the downlink, a downlink pilot signal carrying a set of pilot sequences that are mutually orthogonal in the frequency domain, each pilot sequence in the set of pilot sequences corresponding to an antenna of the Massive MIMO antenna array; and receive an uplink pilot signal carrying the set of pilot sequences transmitted by the small cell repeater terminal on the uplink, the received uplink pilot signal being a frequency converted retransmission of the downlink pilot signal. The measurement extraction circuit is configured to estimate at least one of an uplink channel and a downlink channel between the central node and the small cell repeater terminal based on the set of pilot sequences and the received uplink pilot signal.

At least one other example embodiment provides a small cell repeater terminal for transmitting data through a massive multiple-input-multiple-output (MIMO) backhaul system. According to at least this example embodiment, the terminal includes: a transceiver antenna and a shifter circuit. The transceiver antenna is configured to: receive a trigger signal from a central node of the massive MIMO backhaul system on a downlink channel; receive, from the central node, a downlink pilot signal carrying a set of pilot sequences that are mutually orthogonal in the frequency domain, each pilot sequence in the set of pilot sequences corresponding to an antenna of a Massive MIMO antenna array at the Massive MIMO central node; and transmit, to the central node, an uplink pilot signal carrying the set of pilot sequences on the uplink. The shifter circuit is configured to: cause the small cell repeater terminal to enter a training mode in response to the received trigger signal; and, in the training mode, frequency convert the received downlink pilot signal to generate the uplink pilot signal carrying the set of pilot sequences.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, relay cells, central nodes, centralized RAN servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "central node" may be considered synonymous to, and may hereafter be occasionally referred to as a base station, NodeB, eNodeB, eNB, transceiver station, base transceiver station (BTS), etc. As discussed herein, the central node may have all functionally associated with conventional central nodes in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to network, whereas downlink (or forward link) transmissions refer to transmissions from network to UE.

According to example embodiments, existing radio access network (RAN) elements, relay cells, central nodes, centralized RAN servers, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein existing radio access network (RAN) elements, relay cells, central nodes, centralized RAN servers, etc. may be any physical computer hardware system including one or more processors, various interfaces, a computer readable medium, and (optionally) a display device. The one or more interfaces may be configured to transmit/receive (wireline or wirelessly) data signals to/from one or more other network elements; and to transmit/receive (wireline or wirelessly) controls signals to/from other network elements. In at least one example, the functionality of the existing radio access network (RAN) elements, relay cells, central nodes, centralized RAN servers, etc. may be executed on the one or more processors and the various interfaces.

Although one or more example embodiments may be discussed herein with regard to relatively specific frequencies (e.g., 5.5 GHz, 2.0 GHz, 2.1 GHz, etc.), example embodiments should not be limited to these example frequencies. Example embodiments may be applicable at other frequencies, as would be recognized by one of ordinary skill in the art.

In North America and Europe most cellular access systems and user terminals (e.g., smartphones) utilize frequency-division duplexing (FDD), having dual uplink and downlink access channels in disjoint frequency bands. As a result, the most commercially attractive relay cell for a Massive MIMO system is one that utilizes FDD. However, to use a conventional time-division duplexed (TDD) backhaul connection with a FDD relay cell, the relay cell must buffer and multiplex the simultaneous uplink and downlink access streams into a single time-multiplexed backhaul stream. A FDD backhaul link that provides simultaneous uplink and downlink transmission may avoid this power-costly buffering within the relay cell.

At least one example embodiment provides a Massive MIMO backhaul link that utilizes FDD to enable simultaneous uplink and downlink transmission and avoid the above-mentioned power-costly buffering within the relay cell.

In a conventional Massive MIMO system, an antenna array (sometimes referred to herein as a Massive MIMO antenna array or Massive MIMO array) including a relatively large number of physically relatively small, low-gain antennas serves a multiplicity of terminals where all of the terminals utilize all of the time/frequency resources. In one example, a terminal is built into each of a plurality of relay cells to provide a backhaul link between users and the backhaul network.

On the downlink, a Massive MIMO central node (also sometimes referred to as a Massive MIMO base station) transmits simultaneous data-bearing signals via the Massive MIMO array to the multiplicity of relay cells such that each relay cell receives substantially only the signal intended for that relay cell with minimal interference from signals intended for other relay cells.

On the uplink, the Massive MIMO central node receives, via the Massive MIMO array, the superposition of data-bearing signals transmitted by the relay cells. The received signals are modified by the propagation channels between the relay cells and the Massive MIMO central node. The Massive MIMO central node processes the received signals to recover the individual signals from each of the relay cells.

On both the uplink and the downlink, the Massive MIMO central node utilizes knowledge of the frequency responses of the propagation channels (also referred to as channel estimates, channel knowledge or channel state information (CSI)) that connect each of the antennas to each of the relay cells to perform pre-coding of signals prior to transmitting the signals to the relay cells as well as decoding of signals received from the relay cells.

Conventionally, this channel knowledge is acquired by employing time-division duplexing (TDD) and uplink pilot signals (also referred to as "pilots"). In one conventional example, relay cells transmit known, mutually orthogonal pilot sequences on the uplink, and the Massive MIMO central node estimates the uplink channels from its received pilot signals, which by virtue of TDD reciprocity are equal to the downlink channels. In this example, the time required for training is proportional to the number of terminals and is independent of the number of service antennas in the Massive MIMO array.

In contrast to conventional Massive MIMO systems, according to at least some example embodiments, the channel knowledge (also referred to herein as channel estimates or channel state information (CSI)) are acquired by employing frequency division duplexing (FDD) during a training phase in which a Massive MIMO central node successively transmits pilot signals to each of the relay cells connected to the Massive MIMO central node, and the relay cells successively retransmit the received pilot signal back to the Massive MIMO central node one at a time such that only one of the relay cells retransmits the pilot signal at any given time. The training phase as well as example operation of the Massive MIMO central node and the relay cells during the training phase will be discussed in more detail later.

According to at least some example embodiments, the Massive MIMO central node utilizes a trigger signal to set the relay cells into a training mode (also referred to herein as the calibration mode). To maintain relatively low power consumption at the relay cells, complex processing of the data stream at the relay cells is avoided as much as possible and the majority, if not all, of the complexity of Massive MIMO processing resides in the Massive MIMO central node. With regard to the training phase, for example, to maintain relatively low power consumption an off-band signal with very low transmission rate and simple modulation and coding may be used as the trigger signal to set the relay cells into the training mode. This trigger signal includes an individual code sequence for each of the relay cells, causing each of the relay cells to successively and/or sequentially switch into the pilot retransmission mode (also referred to as the active training mode) for one pilot duration. As mentioned above, when set into the training mode during the training phase, the relay cells retransmit the pilot signal received from the central node one at a time such that only one of the relay cells retransmits the pilot signal at any given time during the training phase. According to at least some example embodiments, to ensure orthogonality of the K pilot sequences, the pilot duration τ may be greater than or equal to K Longer pilot sequences may yield more accurate channel estimates at the expense of greater overhead for training. In one example, the pilot duration τ may be equal or substantially equal to the duration of one 3GPP-LTE subframe (e.g., about 1 millisecond). However, multiple pilot sequences may be transmitted within the 1 millisecond for redundancy and/or noise mitigation.

As an alternative, an in-band signal with very low transmission rate and simple modulation and coding may be used as the trigger signal to set the relay cells into the training mode.

According to at least some example embodiments, the trigger signal is not transmitted with the bandwidth, array gain and directivity of the Massive MIMO antenna array, but in a narrowband auxiliary control channel with an omnidirectional antenna pattern. As an alternative, the trigger signal may be transmitted with a single array antenna or a patch antenna. The trigger signal may contain more code sequences than attached relay cells, so that newly added relay cells may be added to the system without pre-configuration of the newly added relay cells' ID. Further, the trigger signal may contain additional bits of information for redundancy, security, power control or other reasons.

Figure 1:
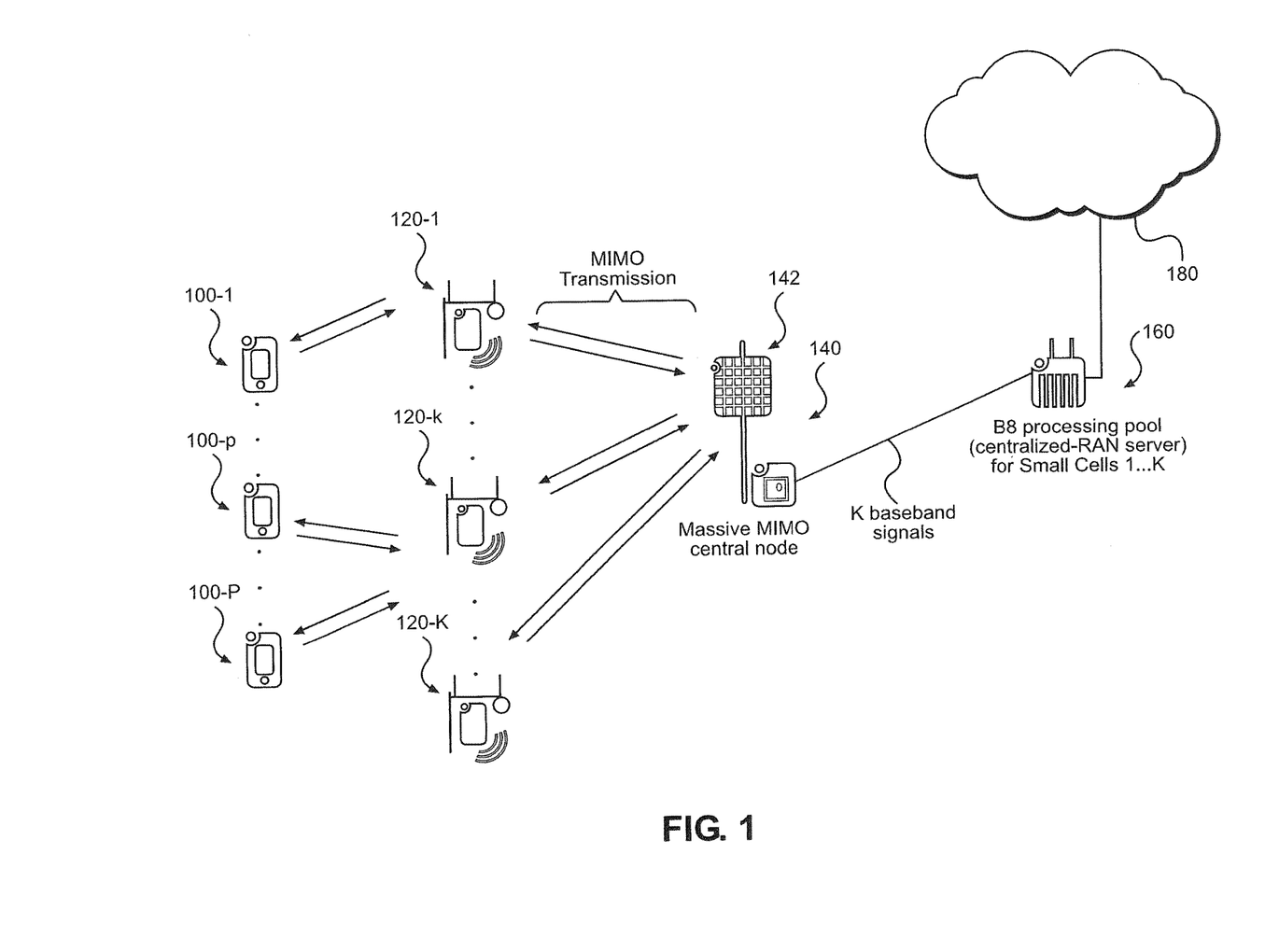
FIG. 1 illustrates a communications network with a backhaul system architecture having a Massive Multiple-Input-Multiple-Output (MIMO) wireless backhaul link.

FIG. 1 illustrates a communications network with a backhaul system architecture having a Massive MIMO wireless backhaul link.

Referring to FIG. 1, the communications network includes: a Massive MIMO central node 140 (also sometimes referred to herein as a Massive MIMO base station); a centralized radio access network (RAN) server 160; a plurality of relay cells 120-1, . . . , 120-k, . . . , 120-K; and a core network 180. FIG. 1 also illustrates a plurality of user equipments (UEs) 100-1, . . . , 100-i p, . . . , 100-P that are served by the relay cells 120-1 through 120-K. As discussed herein, a relay cell may also be referred to as a repeater small cell, a repeater-type small cell, a small cell repeater terminal, and a repeater small cell terminal.

According to at least one example embodiment, the centralized RAN server 160 includes a pool of baseband (BB) processors (also referred to herein as a baseband processing pool) for the relay cells 120-1 through 120-K. Similar to operations performed separately at a plurality of conventional base stations for respective coverage areas, the centralized RAN server 160 performs scheduling, modulation and coding and power control for the UEs 100-1 through 100-P served by the relay cells 120-1 through 120-K. More concisely, the centralized RAN server 160 generates downlink signals for the relay cells 120-1 through 120-K to transmit to UEs, and processes uplink signals from the relay cells for further transmission through the core network. Because operations such as these are well-known, a more detailed discussion is omitted.

The centralized RAN server 160 is communicatively coupled to the Massive MIMO central node 140 through, for example, a wired backhaul link. In one example, the centralized RAN server 160 transmits and receives multiple baseband signals (e.g., $3^{rd}$ Generation Partnership Project Long-Term Evolution (3GPP LTE) baseband signals) to and from the Massive MIMO central node 140 through the wired backhaul link over the common public radio interface (CPRI).

Still referring to FIG. 1, the Massive MIMO central node 140 includes a Massive MIMO antenna array (also sometimes referred to herein as a "Large-Scale Antenna Array") 142 along with associated electronics and signal processing (discussed in more detail later). In this example, the Massive MIMO array 142 includes M antennas (is an M-element antenna array) that provide(s) a wireless backhaul link for the K relay cells 120-1 through 120-K. In this example, M and K may be real or natural numbers, where M may be greater than or equal to 2. In a still more specific example, the Massive MIMO antenna array 142 may have 64 antennas (i.e., M is 64), and 16 relay cells may be connected to the Massive MIMO central node 140 (i.e., K is 16). Example operation of the Massive MIMO array 142 and the Massive MIMO central node 140 will be discussed in more detail later. In addition to the functionality discussed herein, the Massive MIMO central node 140 may also have all conventional functionality as is well-known in the art.

The Massive MIMO central node 140, according to one or more example embodiments, utilizes FDD so there are two disjoint bands of frequency for the backhaul service. These bands of frequency are also disjoint from the two bands of frequency that the relay cells use for access service. Moreover, using FDD at the Massive MIMO central node 140 and the Massive MIMO array 142 enables simultaneous uplink and downlink backhaul transmission between the Massive MIMO array 142 and the relay cells 120-1 through 120-K.

According to at least one example embodiment, the Massive MIMO central node 140 and relay cells 120-1 through 120-K function in two modes: 1) a training mode (also referred to as a calibration mode) in which the Massive MIMO central node 140 obtains channel knowledge (also referred to as channel estimates or channel state information (CSI)) for uplink and downlink propagation channels between the Massive MIMO array 142 and the relay cells 120-1 through 120-K; and 2) a normal transmission mode in which the Massive MIMO central node 140 and relay cells 120-1 through 120-K perform normal backhaul transmission and reception of signals to and from UEs served by the K relay cells 120-1 through 120-K. In both the training mode and the normal transmission mode, orthogonal frequency division multiplexing (OFDM) is employed for transmission and reception of signals on the uplink and downlink. Moreover, since the system is a FDD system, uplink and downlink transmission occurs concurrently or simultaneously.

The Massive MIMO central node 140 is communicatively coupled to the plurality of relay cells 120-1 through 120-K via a Massive MIMO backhaul link. In some cases, the backhaul link may also be referred to as a fronthaul link. In one example, the Massive MIMO central node 140 transmits and receives information to and from the plurality of relay cells 120-1 through 120-K over, for example, 2 GHz and/or 5 GHz channels. Example operation of the relay cells 120-1 through 120-K will be discussed in more detail later.

Figure 2:
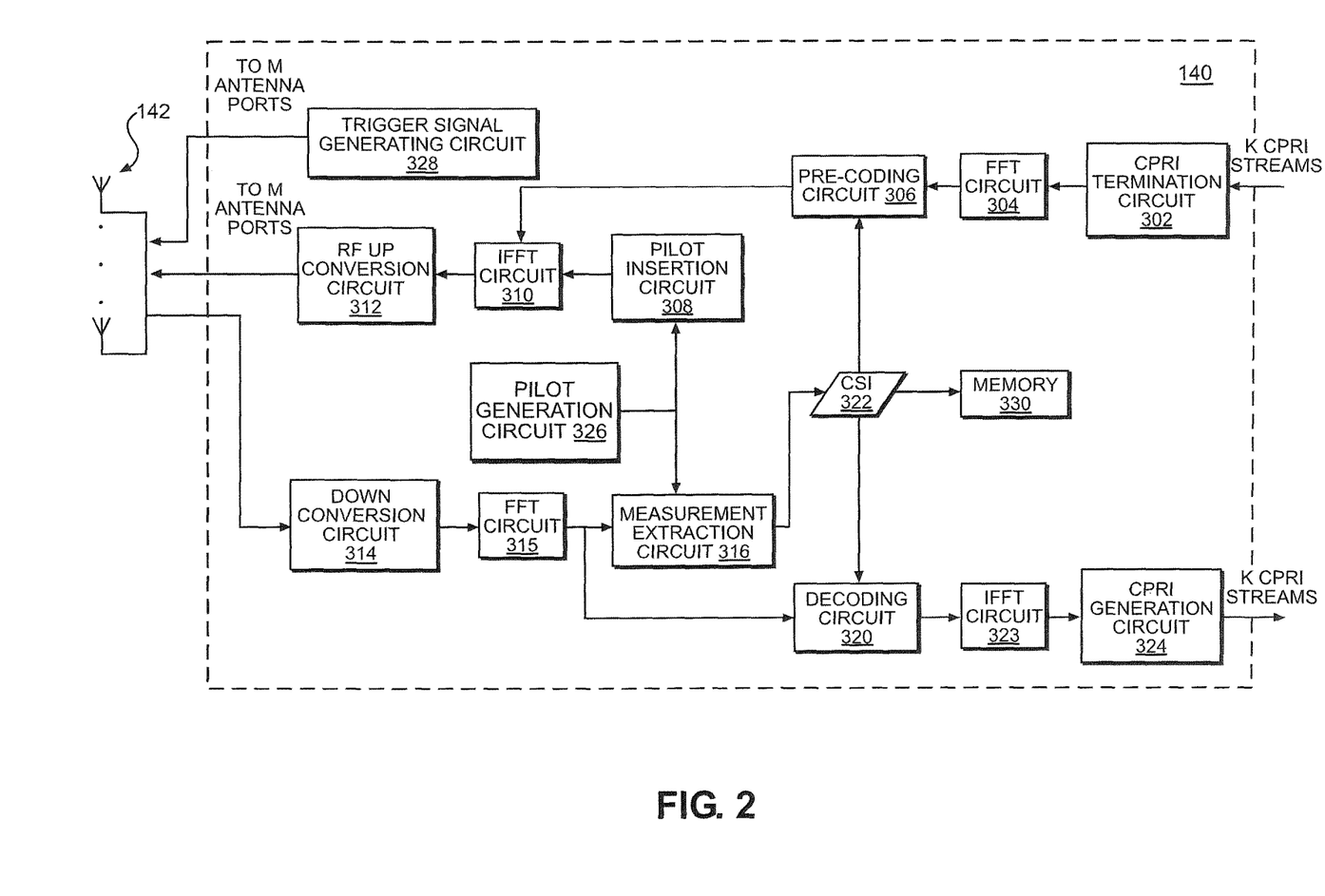
FIG. 2 is a block diagram illustrating an example embodiment of the Massive MIMO central node 140 shown in FIG. 1.

FIG. 2 is a block diagram illustrating an example embodiment of the Massive MIMO central node 140 shown in FIG. 1.

As discussed above, according to at least one example embodiment, the Massive MIMO central node 140 functions in two modes: 1) a training mode (also referred to as a calibration mode) in which the massive MIMO central node 140 obtains channel knowledge (also referred to as channel estimates or channel state information (CSI); and 2) a normal transmission mode in which the Massive MIMO central node 140 performs normal backhaul transmission and reception of signals to and from the K relay cells 120-1 through 120-K via the Massive MIMO antenna array 142.

Figure 3:
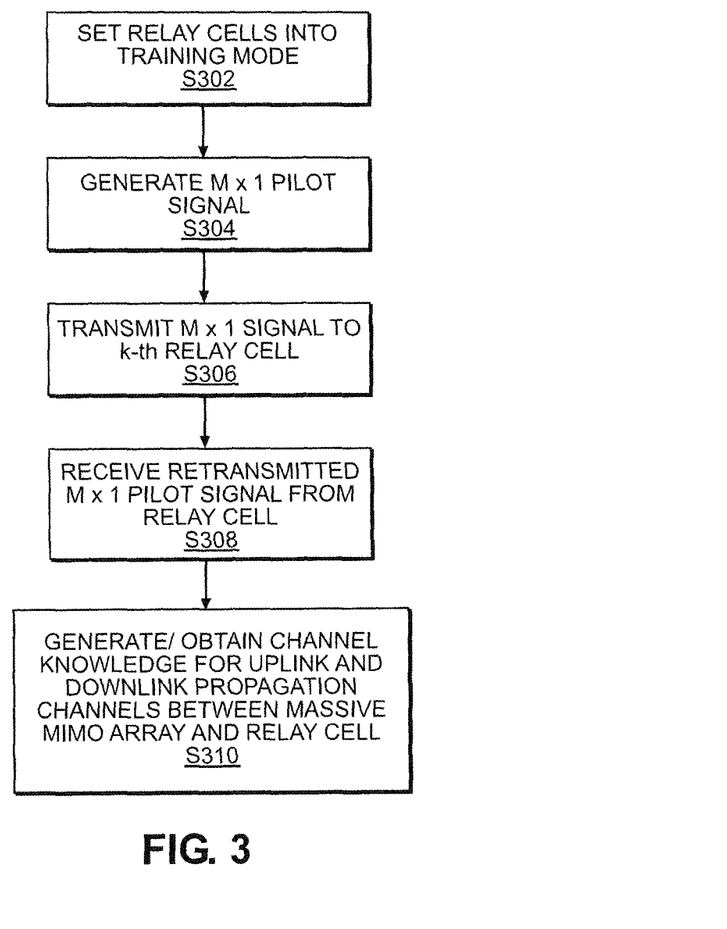
FIG. 3 is a flow chart illustrating a method for obtaining channel estimates for propagation channels between a Massive MIMO central node and relay cells, according to an example embodiment.

Components and example operation of the Massive MIMO central node 140 shown in FIG. 2 will be discussed in more detail below with regard to the flow chart shown in FIG. 3. The flow chart shown in FIG. 3 illustrates an example embodiment of a method for obtaining channel estimates for propagation channels between the Massive MIMO central node 140 and a k-th relay cell 120-k during the training phase. Although the example embodiment shown in FIG. 3 will be discussed with regard to a single relay cell 120-k, it should be understood that similar operations may be performed for each of the K relay cells connected to the Massive MIMO central node 140.

Training Phase

As discussed above, the Massive MIMO central node 140 utilizes uplink and downlink channel estimates to properly pre-code signals for backhaul transmission on the downlink (i.e., from Massive MIMO central node to relay cell), and to properly decode signals received on the uplink (i.e., from relay cell to Massive MIMO central node). The acquisition of these uplink and downlink channel estimates is accomplished during the training phase in which the Massive MIMO central node 140 performs K successive iterations of an operation. During each iteration, the Massive MIMO central node 140 transmits downlink pilot signals from each of the M antennas in the Massive MIMO array 142, and the single one of the K relay cells 120-1 through 120-K retransmits, in real time, a received combined pilot signal on the uplink (with appropriate frequency conversion) while the remaining (K−1) relay cells remain silent; that is, the remaining (K−1) relay cells do not retransmit the received combined pilot signal or perform normal backhaul transmission operations. During the training phase, the relay cells are set into a training or calibration mode in which normal access service is suspended. In at least one example, the suspension of normal access service may refer to configuration in a standard compliant way such as, for example, using almost or substantially empty multicast-broadcast single frequency network (MBSFN) broadcast frames and denying uplink grants.

According to at least some example embodiments, in order to reduce delay of data signals, the K successive iterations of the operations may be distributed over several different training phases. In at least one example, a training phase may be performed for each of the K relay cells, and thus, a training period may ultimately include K training phases. According to at least this example embodiment, the K iterations may not be considered successive, but rather organized in separate training phases with data transmission in between.

Referring now to FIGS. 2 and 3, once having entered the training mode, at step S302 the Massive MIMO central node 140 sets the K relay cells 120-1 through 120-K into the training mode. In more detail, for example, the trigger signal generating circuit 328 generates and outputs an auxiliary trigger signal to the M antenna ports of the Massive MIMO antenna array 142. The Massive MIMO central node 140 then transmits an auxiliary trigger signal to the K relay cells 120-1 through 120-K.

In one example, the Massive MIMO central node 140 may enter the training mode when (i) channel information is deemed to have deteriorated sufficiently such that the channels should be re-estimated, (ii) when a new relay cell enters the system, (iii) at the direction of a network operator, (iv) periodically depending on the variability of the channel (e.g., every few minutes, several times per second, etc.), etc. If the Massive MIMO central node 140 enters the training mode periodically, the period may be specified by a network operator, but the actual entering of the training mode may be triggered without operator interaction, such as by one or more timers.

As discussed above, according to at least one example embodiment, the auxiliary trigger signal is an off-band signal with relatively low transmission rate and relatively simple modulation and coding. This auxiliary trigger signal includes an individual code sequence for each of the relay cells, causing each of the relay cells to successively and/or sequentially switch into a pilot retransmission mode for one pilot duration. In other words, the auxiliary trigger signal also successively designates, during successive pilot durations (and/or training phases), a relay cell from among the K relay cells 120-1 through 120-K to retransmit the pilot signal received from the Massive MIMO central node 140.

In at least one other example embodiment, digital processing at the relay cell may be used to extract the symbol (e.g., OFDM symbol) boundaries of the backhaul signals to improve synchronization and/or relax the requirements of the off-band signal. In yet another example embodiment, the trigger may be fully in-band of the backhaul signals and recovered by (selective) digital signal processing at the relay cells. This is sometimes referred to as "digital assisted pilot retransmission".

According to at least some example embodiments, the auxiliary trigger signal is not transmitted with the bandwidth and array gain and directivity of the Massive MIMO antenna array, but in a narrowband auxiliary control channel with an omni-directional antenna pattern.

As mentioned above, to obtain the channel knowledge for the propagation channels between the Massive MIMO antenna array 142 and a k-th relay cell during the training phase, the Massive MIMO central node 140 relies on only the k-th relay cell 120-k returning the downlink pilots on its uplink backhaul connection with the Massive MIMO central node 140, while all of the other (K−1) relay cells are muted or silent. To do so, the Massive MIMO central node 140 utilizes the auxiliary trigger signal to inform each of the K relay cells when normal access to the backhaul connection with the Massive MIMO central node 140 on the uplink is suspended for pilot transmission.

When the k-th relay cell 120-k is to be designated to retransmit pilot signals received from the Massive MIMO central node 140, the auxiliary trigger signal instructs the k-th relay cell 120-k to enter the pilot transmission mode in which the k-th relay cell 120-k suspends normal transmission activities, but retransmits, on the uplink during a subsequent pilot duration, pilot signals received from the Massive MIMO central node 140 on the downlink. During this pilot duration, the auxiliary trigger signal received by the other (K−1) relay cells instructs the (K−1) other relay cells to enter the silent mode, in which each relay cell suspends normal transmission activities and does not retransmit pilot signals from the Massive MIMO central node 140.

In at least one example embodiment, the analog k-th relay cell 120-k may retransmit the pilot signals instantaneously. In a digital assisted relay cell, the retransmission may be shifted (e.g., by about one OFDM symbol or subframe) by a processing delay at the relay cell.

Returning to FIG. 3, while the K relay cells 120-1 through 120-K are in the training mode and normal backhaul transmission is suspended, at step S304 the Massive MIMO central node 140 generates an M×1 pilot signal based on a set of M pilot sequences created in the OFDM domain, and that are mutually orthogonal to one another over every Nyquist frequency interval. The set of M pilot sequences may span more than one OFDM symbol if necessary, but this is not required.

In more detail, at step S304 the orthogonal pilot generation circuit 326 generates the set of M downlink pilot sequences, and outputs the generated set of M pilot sequences to the pilot insertion circuit 308. The orthogonal pilot generation circuit 326 also outputs the set of M downlink pilot sequences to the measurement extraction circuit 316 for use in computing the channel knowledge, which is discussed later. The set of M downlink pilot sequences may be stored in a buffer (not shown). According to at least some example embodiments, the pilot insertion by the pilot insertion circuit 308 and the extraction performed at the measurement extraction circuit 316 may be controlled and/or synchronized with the generating of the trigger signal by the trigger signal generating circuit 328.

The pilot insertion circuit 308 inserts the generated set of M pilot sequences into corresponding M frequency-domain pulses, where each of the M frequency-domain pulses (or alternatively Walsh codes) corresponds to an antenna among the M antennas of the Massive MIMO antenna array 142 at the Massive MIMO central node 140. The M frequency-domain pulses are output to an IFFT circuit 310.

The IFFT circuit 310 generates an M-component baseband signal by taking the M inverse Fast Fourier Transform (FFT) of each of the M frequency-domain pulses from the pilot insertion circuit 308. The radio-frequency (RF) up-conversion circuit 312 converts the M-component baseband signal into analog form, and up-converts the analog signal to the downlink backhaul carrier frequency (e.g., about 5.6 GHz). The RF up-conversion circuit 312 outputs the up-converted analog signal to the M antenna ports for transmission of the M×1 pilot signal to the k-th relay cell 120-k on the downlink.

Returning to FIG. 3, at step S306 the Massive MIMO central node 140 transmits the M×1 pilot signal to the k-th relay cell 120-k on the downlink via the Massive MIMO antenna array 142.

Upon receipt, the k-th relay cell 120-k converts the received M×1 pilot signal from the downlink carrier frequency to the uplink carrier frequency, and retransmits the M×1 pilot signal back to the Massive MIMO central node 140 on the uplink. Although discussed herein primarily with regard to being fully analog, the conversion at the relay cell may be digitally assisted with some filtering or processing of the received M×1 pilot signal to remove pilot contamination from interfering Massive MIMO central nodes. A more detailed discussion of example functionality of the k-th relay cell will be provided later with regard to FIGS. 4 and 5.

At step S308, the Massive MIMO central node 140 receives the retransmitted M×1 pilot signal from the k-th relay cell 120-k on the uplink.

In a more detailed example, if the M×1 downlink pilot signal transmitted by the Massive MIMO central node 140 at step S306 is denoted $x_p(f)$, and the k-th relay cell 120-k retransmits its received pilot signal, then the M×1 pilot signal $y_{pk}(f)$ received by the Massive MIMO antenna array 142 from the k-th relay cell 120-k on the uplink (ignoring noise and interference) is given by Equation (1) shown below:

$$y_{pk}(f) = g_{uk}(f) g_{dk}^T(f) x_p(f) \qquad (1).$$

In Equation (1), as functions of frequency, $g_{uk}(f)$ is the M×1 uplink channel vector between the k-th relay cell 120-k and the Massive MIMO antenna array 142, $g_{dk}(f)$ is the M×1 downlink channel vector between the Massive MIMO antenna array 142 and the k-th relay cell 120-k, and $x_p(f)$ is the M×1 vector of orthogonal pilot signals transmitted by the Massive MIMO antenna array 142. In Equation (1), the superscript 'T' denotes transpose, and thus, $g_{dk}^T(f)$ denotes the transpose of the M×1 downlink channel vector between the Massive MIMO antenna array 142 and the k-th relay cell 120-k.

In this example, the downlink pilot signal $x_p(f)$ is assumed to be generated via OFDM, with a cyclic prefix that exceeds the sum of the downlink delay spread and the uplink delay spread.

By replacing the frequency variable $f$ in Equation (1) with the OFDM tone index n, the M×1 pilot signal $y_{pk}(f)$ received at the Massive MIMO central node 140 is given by Equation (2) shown below.

$$y_{pkn} = g_{ukn} g_{dkn}{}^T x_{pn} \qquad (2)$$

The frequency response of the propagation channel typically does not change instantaneously with frequency. In fact, the frequency Nyquist interval is equal or substantially equal to the reciprocal of the total delay spread, which by design is less than the duration of the cyclic prefix. Expressed in OFDM tones, the Nyquist interval $N_{Nyquist}$ for a given frequency is equal to the OFDM usable interval $T_u$ divided by the channel delay spread $T_d$, as shown below in Equation (3).

$$N_{Nyquist} = \frac{T_u}{T_d} \qquad (3)$$

For conventional OFDM parameters (e.g., an OFDM symbol interval equal to about $\frac{1}{14}$ milliseconds (ms), a usable interval ($T_u$) of about $\frac{1}{15}$ ms, and a guard interval of about $$\frac{1}{(14 \times 15)}$$

ms), and assuming a worst case scenario where the delay spread $T_d$ is equal to the guard interval, the Nyquist interval $N_{Nyquist}$ is equal to 14 tones. Accordingly, in this case the channel response is substantially constant over 14-tone intervals. By restricting the OFDM tone index in Equation (2) to one of these 14 Nyquist intervals in which the frequency responses are substantially constant, the received M×1 pilot signal $y_{pkn}$ can be expressed as shown below in Equation (4).

$$y_{pkn} = g_{uk} g_{dk}{}^T x_{pn}, \text{ where } n = n_0, n_0+1, \ldots, (n_0 + N_{Nyquist}-1) \qquad (4)$$

According to at least some example embodiments, more effective pilot sequences may be those pilot sequences that are mutually orthogonal in the frequency domain. The pilot sequences that are mutually orthogonal in the frequency domain can be represented by a M×τ unitary matrix φ, such that $\phi^H \phi = I_M$, where $M \leq \tau \leq N_{Nyquist}$. The "H" denotes "conjugate transpose", and thus, $\phi^H$ denotes the conjugate transpose of the unitary matrix φ. $I_M$ is the identity matrix.

Notably, if pilot signals longer than the Nyquist interval are needed to accommodate a larger number of service antennas, or to improve the signal-to-noise ratio (SNR) of the received pilot signal, then two or more consecutive OFDM signals may be employed during the training phase.

Given that the pilot sequences are mutually orthogonal in the frequency domain, Equation (4) can be re-written in matrix form as shown below in Equation (5).

$$[y_{pk1} \ldots y_{pk\tau}] = g_{uk} g_{dk}{}^T [x_{p1} \ldots x_{p\tau}] \qquad (5),$$

and Equation (5) can be rewritten as shown below in Equation (6).

$$Y_{pk} = g_{uk} g_{dk}{}^T \phi^T \qquad (6),$$

where $[x_{p1} \ldots x_{p\tau}] = \phi^T$. As shown in Equations (5) and (6), $Y_{pk}$ is a M×τ matrix, which is a function of $g_{uk}$, $g_{dk}{}^T$, and $\phi^T$. Since the M row vectors of the M×τ matrix have been combined on the downlink, the M row vectors of the M×τ matrix are not orthogonal. As discussed herein, $Y_{pk}$ may be referred to as the received re-transmitted pilot signal or the M returned pilot signals received by the Massive MIMO antenna array 142.

Returning to FIG. 3, at step S310 the Massive MIMO central node 140 generates the channel knowledge (referred to as CSI 322 in FIG. 2) for the propagation channels between the Massive MIMO antenna array 142 and the k-th relay cell 120-k. In one example, the Massive MIMO central node 140 computes channel state information (CSI) for the uplink and downlink channel between the Massive MIMO array 142 and the k-th relay cell 120-k based on the received re-transmitted pilot signal $Y_{pk}$ from the k-th relay cell 120-k and the original set of M pilot sequences generated by the pilot generation circuit 326. The channel knowledge for the uplink and downlink channel between the Massive MIMO array 142 and the k-th relay cell 120-k may also be referred to as an estimate of the uplink and downlink propagation channels between the Massive MIMO array 142 and the k-th relay cell 120-k.

In one example, the Massive MIMO central node 140 correlates the received re-transmitted pilot signal with at least one pilot sequence in the set of M pilot sequences, and estimates one or more of the uplink and downlink propagation channels based on the correlations.

In a more specific example, the Massive MIMO central node 140 correlates the received re-transmitted pilot signal with each pilot sequence in the set of M pilot sequences, and estimates one or more of the uplink and downlink propagation channels based on the correlations. In correlating the received re-transmitted pilot signal with each pilot sequence in the set of M pilot sequences, the Massive MIMO central node 140 may generate a M×M up/down matrix of correlation values, where each correlation value is indicative of a correlation between one of the M received uplink pilot signals and a pilot sequence in the set of M pilot sequences, and estimate one or more of the uplink and downlink propagation channels based on the M×M up/down matrix. The Massive MIMO central node 140 may estimate one or more of the propagation channels by identifying a dominant singular value from among the correlation values in the M×M up/down matrix, and then estimating at least one of the uplink channel and the downlink channel based on the identified dominant singular value. The singular vectors associated with the dominant singular value are indicative of a relative value of a component of a propagation vector for the uplink and/or downlink channel between the relay cell and the central node.

In more detail with regard to the example embodiment of the Massive MIMO central node 140 shown in FIG. 2, at step S308 the Massive MIMO antenna array 142 receives the retransmitted pilot signal from the k-th relay cell 120-k, and inputs the received pilot signal to the down-conversion circuit 314. The down-conversion circuit 314 down-converts and digitizes the received signal, and outputs the digital signal to the FFT circuit 315. The FFT circuit 315 performs a FFT on the digital signal from the down-conversion circuit 314, and outputs the received re-transmitted pilot signal $Y_{pk}$ to the measurement extraction circuit 316.

In more detail with regard to step S310, the measurement extraction circuit 316 computes channel state information for the uplink and downlink propagation channels between the Massive MIMO array 142 and the k-th relay cell 120-k based on the received re-transmitted pilot signal $Y_{pk}$ and the original set of M pilot sequences from the pilot generation circuit 326.

For example, the measurement extraction circuit 316 processes the received re-transmitted pilot signal $Y_{pk}$ by correlating the received signal with each of the M pilot sequences in the set of M pilot sequences, which is equivalent to multiplying the received re-transmitted pilot signal $Y_{pk}$ given in Equation (6) by the complex conjugate of the unitary matrix $\phi^*$ as shown below in Equation (7).

$$Z_{pk} = Y_{pk}\phi^* = g_{uk}g_{dk}{}^T\phi^T\phi^* = g_{uk}g_{dk}{}^T \qquad (7)$$

Thus, the processed pilot signals $Z_{pk}$ is a M×M matrix $g_{uk}g_{dk}{}^T$ that is theoretically of rank-one. In the presence of noise the M×M matrix (also referred to as the M×M up/down matrix) will in fact be full-rank, but with one dominant singular value. Hence, the Massive MIMO central node 140 performs singular value decomposition (SVD) of the processed signal $Z_{pk}$, and the left and right singular vectors associated with the largest singular value are proportional to the uplink and downlink propagation channels between the Massive MIMO antenna array 142 and the k-th relay cell 120-$k$, respectively. This procedure represents the best least-squares fit of the rank-one model to the processed signal $Z_{pk}$. According to at least this example embodiment, the singular vectors associated with the dominant singular value may be characterized as being indicative of a relative value of a component of an uplink and/or downlink propagation vector for the uplink and/or downlink channels between the Massive MIMO antenna array 142 and the k-th relay cell 120-k.

According to Equation (7), the relative values of the M components of the uplink propagation vector are uniquely determined, as are the relative values of the M components of the downlink propagation vector. In more detail, through SVD the Massive MIMO central node 140 obtains an approximation of the processed signal $Z_{pk}$ given by Equation (8) shown below.

$$Z_{pk} \approx \nu\alpha\beta^H = \hat{g}_{uk}\hat{g}_{dk}{}^T \qquad (8)$$

In Equation (8), $\hat{g}_{uk}$ and $\hat{g}_{dk}{}^T$ are estimates of $g_{uk}$ and $g_{dk}{}^T$, respectively, $\alpha$ and $\beta$ are unitary vectors, and $\upsilon$ is the positive-real largest singular value of the M×M matrix. On average, the downlink frequency response should have approximately the same power as the uplink frequency response. Accordingly, the power of the singular value may be divided equally or substantially equally between the uplink and downlink to allow for estimation of $\hat{g}_{uk}$ and $\hat{g}_{dk}{}^T$ as shown below in Equations (9) and (10).

$$\hat{g}_{uk} = \sqrt{\nu}\alpha \qquad (9)$$

$$\hat{g}_{dk} = \sqrt{\nu}\beta^* \qquad (10)$$

There may also be overall phase uncertainty that cannot be resolved. With this in mind, one could advance the phase of each of the uplink channel estimates by the same amount and retard the phase of each of the downlink channel estimates by the same amount. However, this is of no consequence for the operations of the relay cell because doing so will not affect the Massive MIMO backhaul operations, as the internal pilots carried by $3^{rd}$ Generation Partnership Project Long-Term Evolution (3GPP LTE) signals will automatically compensate for any phase offsets. It is also possible that actual instantiations of propagation may be at variance with the equal division of power in Equations (9) and (10), the effect of which would be that the baseband signals conveyed to and from the relay cells would be received with a modified—and somewhat unknown—frequency response. Again, the internal pilots carried by the LTE signals should compensate for this. As an alternative, power control may be applied to adjust the uplink transmission to compensate for the above-mentioned phenomenon.

The obtained CSI 322 for the propagation channels between the massive MIMO array 142 and the k-th relay cell 120-k is output to the pre-coding circuit 306 and the decoding circuit 320 for use during the normal transmission mode, which is discussed in more detail below. The Massive MIMO central node 140 may include a memory 330 for storing the channel knowledge (CSI 322) obtained by the measurement extraction circuit 316.

The memory 330 shown in FIG. 2 may also store an operating system and any other routines/modules/applications for providing the functionalities of the Massive MIMO central node 140, including those discussed herein. These software components may also be loaded from a separate computer readable storage medium into memory 330 using a drive mechanism (not shown). Such separate computer readable storage medium may include a disc, tape, DVD/CD-ROM drive, memory card, or other like computer readable storage medium (not shown). In some embodiments, software components may be loaded into memory 330 via one of the various interfaces (not shown), rather than via a computer readable storage medium.

During the one or more training phases, the Massive MIMO central node 140 performs the above-discussed process for each of the K relay cells 120-1 through 120-K. In so doing, the Massive MIMO central node 140 transmits the M×1 pilot signals a total of K times, and during each of K successive pilot durations, exactly one of the K relay cells transmits its received pilot signal on the uplink in real time (and with frequency conversion), while the other K−1 relay cells are silent.

In at least some example embodiments, the training phase is complete once the Massive MIMO central node 140 has obtained channel knowledge for uplink and downlink propagation channels between the Massive MIMO antenna array 142 and each of the K relay cells 120-1 through 120-K. Once the training phase is complete, the Massive MIMO central node 140 may output a subsequent auxiliary trigger signal to the K relay cells 120-1 through 120-K instructing the K relay cells 120-1 through 120-K to resume normal backhaul transmission operations on the uplink and downlink. Normal backhaul transmission of the Massive MIMO central node 140 will be discussed in more detail below.

Normal Transmission Mode

Still referring to FIG. 2, in the normal backhaul transmission mode, on the downlink the Massive MIMO central node 140 receives K complex baseband signals via CPRI from the centralized RAN server 160. The CPRI termination circuit 302 converts the K downlink complex baseband signals to digital baseband signals, and outputs the K digital baseband signals to the FFT circuit 304. The FFT circuit 304 performs a FFT of each digital baseband signal, and outputs the transformed signals to the pre-coding circuit 306.

The pre-coding circuit 306 performs Massive MIMO pre-coding of the transformed signals from the FFT circuit 304 based on (and utilizing) the channel knowledge (CSI 322) obtained during the training phase discussed above with regard to FIG. 3.

The pre-coding circuit 306 utilizes the channel knowledge for the downlink propagation channel (also referred to as downlink channel estimates or estimates of the downlink channel) to perform pre-coding operations on downlink signals from the centralized RAN server 160 to be transmitted to the relay cells 120-1 through 120-K. As is known, pre-coding operations ensure that each relay cell receives substantially only the signal intended for that relay cell. One example pre-coding operation is known as beamforming. In the following discussion, the subscript 'd' denotes downlink transmissions.

An example beamforming operation to generate a pre-coded downlink signal $x_d(f)$ for transmission by the Massive MIMO central node 140 to the relay cells 120-1 through 120-K is given by Equation (11) shown below.

$$x_d(f) = \hat{G}^*_d(f) D_{\eta_d} a_d(f) \tag{11}$$

In Equation (11), $\hat{G}_d^*(f)$ is the estimated M×K downlink frequency response, the superscript "*" denotes "complex conjugate", $a_d(f)$ is the K×1 vector of downlink backhaul signals transmitted between the Massive MIMO array 142 and the K relay cells 120-1 through 120-K, and $D_{\eta_d}$ is the K×K diagonal matrix of the power-control coefficients.

Another example pre-coding operation is known as zero-forcing. An example of a zero-forcing operation to generate a pre-coded downlink signal $x_d(f)$ is given by Equation (12) shown below.

$$x_d(f) = \hat{G}_d^*(f)(\hat{G}_d^T(f)\hat{G}_d^*(f))^{-1} D_{\eta_d} a_d(f) \tag{12}$$

The downlink power control (e.g., $D_{\eta_d}$ in Equations (11) and (12)) ensures that each of the relay cells has the same or substantially the same signal-to-interference and noise ratio (SINR). The power control coefficients may be chosen based on downlink beam forming gains obtained from the channel estimation according to known algorithms.

Still referring to FIG. 2, the pre-coding circuit 306 outputs the pre-coded signals to the IFFT circuit 310, which generates an M-component baseband signal in the time domain by taking the M inverse FFT of the pre-coded signals from the pre-coding circuit 306. The RF up-conversion circuit 312 then converts the M-component baseband signal into analog form, and up-converts the analog signal to the downlink carrier frequency of, for example, about 5.6 GHz. The RF up-conversion circuit 312 outputs the up-converted analog signal to the Massive MIMO antenna array 142 for transmission to the K relay cells 120-1 through 120-K on the downlink.

On the uplink, the Massive MIMO central node 140 receives backhaul transmissions from the K relay cells 120-1 through 120-K at the Massive MIMO antenna array 142. The uplink signals that constitute the backhaul transmissions between the relay cells 120-1 through 120-K and the Massive MIMO array 142 are complex analog baseband signals. According to at least some example embodiments, it is assumed that the spectral bandwidth of the Massive MIMO links is greater than or equal to the bandwidth of the analog signals that are to be transmitted. However, example embodiments are not limited to this assumption.

In one example, on the uplink the k-th relay cell 120-k transmits the signal $\eta_k a_{uk}(t)$ to the Massive MIMO central node 140. In the transmitted signal, $a_{uk}(t)$ is the complex baseband signal received on the radio access links from UEs (e.g., UEs 100-p and 100-P) attached to the k-th relay cell 120-k, and $\eta_k$ is a power-control coefficient. The subscript 'u' denotes transmission on the uplink between the relay cells and the Massive MIMO central node. The transmitted uplink signal $\eta_k a_{uk}(t)$ from the k-th relay cell 120-k passes through the uplink propagation channels to the Massive MIMO array 142 at the Massive MIMO central node 140, where the m-th antenna of the Massive MIMO array 142 receives the superposition of signals given by Equation (13) shown below (ignoring noise and possible interference):

$$y_{um}(t) = \Sigma_{k=1}^K g_{umk}(t) * \eta_k a_{uk}(t), \quad m=1,\ldots,M \tag{13}$$

In Equation (13), $g_{umk}(t)$ is the baseband complex-valued impulse response of the uplink propagation channel between the k-th relay cell 120-k and the m-th antenna of the Massive MIMO array 142. In vector/matrix notation the signal received by the Massive MIMO array 142 is given by Equation (14) shown below:

$$y_u(t) = G_u(t) * D_{\eta_u} a_u(t) \tag{14}$$

In Equation (14), $G_u(t)$ is the M×K impulse response of the uplink channel, $a_u(t)$ is the K×1 vector of backhaul signals transmitted on the uplink, and $D_{\eta_u}$ is the K×K diagonal matrix of power-control coefficients. In Equation (14), '*' represents convolution. Since convolution in the time domain is equivalent to multiplication in the frequency domain, Equation (14) can be rewritten as Equation (15) shown below.

$$y_u(f) = G_u(f) D_{\eta_u} a_u(f) \tag{15}$$

As discussed below, Equation (15) may be used to obtain an estimate of the uplink transmitted backhaul signals $a_u(f)$.

On the uplink, power control seeks to equalize the signal-to-interference and noise ratios (SINRs) of the uplink signals as processed by the Massive MIMO array 142. This ensures that each relay cell uses only as much power as necessary, and that signals transmitted by relay cells closer to the Massive MIMO array 142 do not overwhelm signals from the relay cells located further from the Massive MIMO array 142. Since the relay cells do not know the uplink channels, the Massive MIMO central node 140 computes the power control coefficients and conveys the computed power control coefficients to the relay cells. In one example, the Massive MIMO central node 140 sends the power control coefficients to each repeater small cell via a narrowband auxiliary wireless control channel. In another example, the Massive MIMO central node 140 transmits the power control coefficients to the relay cells in an interval following the pilot transmission interval.

Returning to FIG. 2, the Massive MIMO antenna array 142 outputs the signal received at each of the M antennas via a corresponding antenna port to the down-conversion circuit 314 at an uplink carrier frequency of, for example, about 5.5 GHz. The down-conversion circuit 314 down-converts and digitizes the received signals, and outputs the M digital signals to the FFT circuit 315.

The FFT circuit 315 performs a FFT on each of the M digital signals from the down-conversion circuit 314, and outputs the M transformed signals to the decoding circuit 320. Unlike the training mode, the measurement extraction circuit 316 is skipped and not used in the normal transmission mode. Thus, the FFT circuit 315 outputs the transformed signals to the decoding circuit 320, rather than to the measurement extraction circuit 316 as is the case during the training phase.

Still referring to FIG. 2, the decoding circuit 320 decodes the M transformed signals using the channel knowledge (CSI 322) obtained during the above-discussed training phase.

In more detail, with regard to uplink transmissions from the k-th relay cell 120-k, the decoding circuit 320 utilizes the channel knowledge for the uplink propagation channels between the k-th relay cell 120-k and the Massive MIMO antenna array 142 obtained during the training phase to process the received signal $y_u(f)$ and recover the individual transmitted signal or signals from the k-th relay cell 120-k including signals received from the UEs attached to the k-th relay cell 120-k. In one example, the Massive MIMO central node 140 utilizes matched filtering, which in the frequency domain, takes the form shown below in Expression (16):

$$\hat{a}_u(f) \propto \hat{G}_u^H(f) u_u(f) \tag{16}$$

In Expression (16), $\hat{a}_u(f)$ is an estimate of the transmitted signal, $\hat{G}_u^H(f)$ denotes the conjugate transpose of the $\hat{G}_u(f)$, which is an estimate of the M×K uplink frequency response. As mentioned above, the superscript "H" denotes "conjugate transpose".

In another example, the Massive MIMO central node 140 may utilize zero-forcing to recover an estimate of the transmitted uplink signals as shown below in Expression (17).

$$\hat{a}_u(f) \propto (\hat{G}_u^H(f)\hat{G}_u(f))^{-1}\hat{G}_u^H(f)y_u(f) \qquad (17)$$

Returning to FIG. 2, after recovering the individual transmitted signals from the K relay cells, the decoding circuit 320 outputs the decoded signals to the IFFT circuit 323, which performs an inverse FFT of each of the decoded signals to generate K complex baseband signals, where each complex baseband signal corresponds to a relay cell from among the relay cells 120-1 through 120-K. The IFFT circuit 323 outputs the K complex baseband signals to the CPRI generation circuit 324, which converts the complex baseband signals to CPRI format for further transmission to the backhaul network over a wired backhaul link. The CPRI generation circuit 324 then transmits the CPRI signals to the centralized RAN server 160 for conventional LTE processing (i.e., termination of the RAN protocols of the UE). The centralized RAN server 160 then transmits the processed signals of the UEs to the core network 180 for further transmission and destination delivery.

Figure 4:
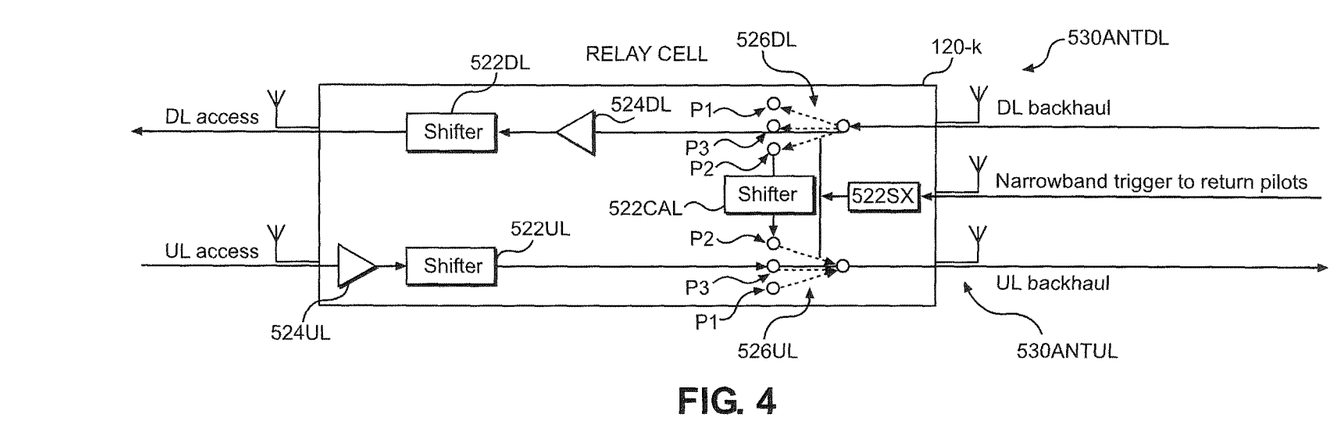
FIG. 4 is a block diagram illustrating an example embodiment of a k-th relay cell 120-k shown in FIG. 1.

FIG. 4 is a block diagram illustrating an example embodiment of the k-th relay cell 120-k. Although only a single relay cell is discussed herein, each of the K relay cells 120-1 through 120-K may be configured and operate in the same or substantially the same manner.

Referring to FIG. 4, the k-th relay cell 120-k includes a switch controller 522SX that controls a downlink three-way switch 526DL and an uplink three-way switch 526UL according to the auxiliary trigger signal received from the Massive MIMO central node 140. In the training mode, the three-way switches 526UL and 526DL feed the received signals through a shifter 522CAL that includes a mixer to convert the received analog M×1 pilot signal from the downlink carrier frequency to the uplink carrier frequency for retransmission to the Massive MIMO central node 140 during a given pilot duration. In a digital assisted relay cell, the shifter 522CAL may also perform some filtering of the received signals.

In more detail, based on the auxiliary trigger signal from the Massive MIMO central node 140, the switch controller 522SX sets each of the three-way switches 526DL and 526UL into one of three operating positions.

When the three-way switches 526DL and 526UL are in a first position P1, the relay cell does not transmit on the uplink of the backhaul link or on the downlink of the access link; that is, the relay cell is silent or muted.

When the switch controller 522SX sets the three-way switches 526UL and 526DL in the second position P2, the M×1 pilot signal received from the Massive MIMO central node 140 on the downlink is fed through the shifter 522CAL. The shifter 522CAL converts the downlink M×1 pilot signal from the downlink carrier frequency to an uplink carrier frequency, and outputs the converted M×1 pilot signal to the three-way switch 526UL for retransmission to the Massive MIMO central node 140 on the uplink.

When the three-way switches 526DL and 526UL are in a third position P3, the relay cell 120k performs normal relay of signals on the uplink and downlink. For normal relaying of signals on the downlink, the downlink backhaul signal is received from the Massive MIMO central node 140 by the downlink transceiver antenna 530ANTDL at a carrier frequency of about 5.6 GHz, and input to the amplifier 524DL. The amplifier 524DL amplifies the received backhaul signal, and outputs the amplified downlink backhaul signal to the downlink shifter 522DL. The downlink shifter 522DL frequency-converts the amplified downlink backhaul signal to the downlink access carrier frequency of about 2.65 GHz, and the relay cell 120-k transmits the converted downlink signal to the UEs served by the relay cell 120-k.

On the uplink, the relay cell 120-k receives a combined uplink access signal from the UEs served by the relay cell 120-k at a carrier frequency of about 2.55 GHz. The received uplink access signal is input to the amplifier 524UL, which amplifies the combined access signal from the UEs and outputs the amplified combined signal to the uplink shifter 522UL. The uplink shifter 522UL frequency-converts the amplified combined signal to the uplink backhaul carrier frequency of, for example, about 2.1 GHz or 5.5 GHz for transmission to the Massive MIMO central node 140 by the uplink transceiver antenna 530ANTUL on the uplink backhaul between the relay cell 120-k and the Massive MIMO central node 140.

The frequency converted signal is output to the uplink three-way switch 526UL, and then transmitted by the relay cell 120-k to the Massive MIMO central node 140 via the uplink transceiver antenna 530ANTUL. The relay cell 120-k may simultaneously and/or concurrently transmit uplink and downlink signals to and from the UEs served by the relay cell 120-k.

Figure 5:
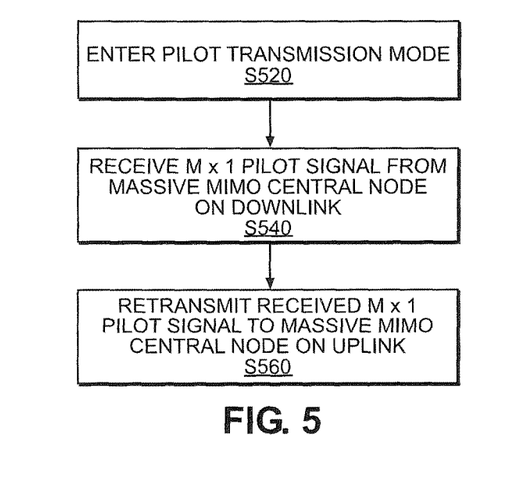
FIG. 5 is a flow chart illustrating a method of operation of the relay cell of FIG. 4 during the training phase, according to an example embodiment.

FIG. 5 is a flow chart illustrating a method of operation of the relay cell shown in FIG. 4 in the pilot transmission mode during the training phase, according to an example embodiment.

Referring to FIGS. 4 and 5, at step S520 the relay cell 120-k enters the pilot transmission mode for a pilot duration in response to receiving the auxiliary trigger signal from the Massive MIMO central node 140. As mentioned above, in the pilot transmission mode, the switch controller 522SX sets the three-way switches 526UL and 526DL in the second position, such that each of the uplink three-way switch 526UL and the downlink three-way switch 526DL are coupled to the shifter 522CAL.

At step S540, the relay cell 102-k receives the downlink M×1 pilot signal from the Massive MIMO central node 140 at the downlink transceiver antenna 530ANTDL on the downlink. The received M×1 pilot signal is fed to the shifter 522CAL by the downlink three-way switch 526DL. The shifter 522CAL converts the received M×1 pilot signal from the downlink carrier frequency to the uplink carrier frequency, and outputs the converted M×1 pilot signal to the three-way switch 526UL for transmission back to the Massive MIMO central node 140 by the uplink transceiver antenna 530ANTUL on the uplink at the uplink carrier frequency.

At step S560, the relay cell 120-k retransmits the received M×1 pilot signal to the Massive MIMO central node 140 on the uplink via uplink transceiver antenna 530ANTUL.

After retransmitting the received M×1 pilot signal back to the Massive MIMO central node 140 on the uplink, and expiration of the corresponding pilot duration, the relay cell 120-k exits the pilot transmission mode. In an example in which a plurality of training phases are used, after exiting the pilot transmission mode the relay cell 120-k may enter the normal transmission mode and resume normal operation. Alternatively, in an example in which a single training phase is used, after exiting the pilot transmission mode, the relay cell 120-k may become and remain silent until a subsequent auxiliary trigger signal is received from the Massive MIMO central node 140 setting the relay cell 120-k back to the normal transmission mode. Once set into the normal transmission mode, the relay cell 120-k resumes normal operation by relaying uplink and downlink signals accordingly.

Example embodiments may widen the applicability of relatively low-power consumption relay cells. Example embodiments may also provide a more flexible and relatively low effort deployment of relatively large amounts of relay cells because multiple relay cells can be served with the same wireless backhaul link. The relay cell applies low transmit power on the backhaul uplink, leveraging the MIMO antenna gain, and outsources most of the access and backhaul signal processing into the MIMO central node and the baseband pool. The resulting relatively low power architecture facilitates the practical deployment of renewable energy sources with relay cells thereby reducing the operational expense and the total cost of deployment. The architecture according to one or more example embodiments also allows for the deployment of relay cells at almost any location, independent of the availability of power, for example in bad-grid and off-grid scenarios. Further, the Massive MIMO backhaul link does not require line-of-sight condition to the central node.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for channel estimation in a massive multiple-input-multiple-output (MIMO) backhaul system, the method comprising:
   transmitting, by a central node of the MIMO backhaul system to a small cell repeater terminal on the downlink, a downlink pilot signal carrying a set of pilot sequences that are mutually orthogonal in the frequency domain, each pilot sequence in the set of pilot sequences corresponding to an antenna of an antenna array at the central node;
   receiving, at the central node, an uplink pilot signal carrying the set of pilot sequences transmitted by the small cell repeater terminal on the uplink, the received uplink pilot signal being a frequency converted retransmission of the downlink pilot signal; and
   estimating at least one of an uplink channel and a downlink channel between the central node and the small cell repeater terminal based on the set of pilot sequences and the received uplink pilot signal.

2. The method of claim 1, wherein the estimating step comprises:
   correlating the received uplink pilot signal with at least one pilot sequence in the set of pilot sequences; and
   estimating at least one of the uplink channel and the downlink channel based on the correlating step.

3. The method of claim 2, wherein the antenna array includes M antennas, where M is a real number greater than or equal to 2, and the correlating step includes,
   generating a M×M up/down matrix of correlation values, each correlation value being indicative of a correlation between one of the M received uplink pilot signals and a pilot sequence in the set of pilot sequences, and wherein
   the estimating step estimates at least one of the uplink channel and the downlink channel based on the M×M up/down matrix.

4. The method of claim 3, wherein the estimating step further comprises:
   identifying a dominant singular value from among the correlation values in the M×M up/down matrix; and
   estimating at least one of the uplink channel and the downlink channel based on the identified dominant singular value.

5. The method of claim 4, wherein singular vectors associated with the dominant singular value are indicative of a relative value of a component of an uplink propagation vector for the uplink channel between the small cell repeater terminal and the central node.

6. The method of claim 4, wherein singular vectors associated with the dominant singular value are indicative of a relative value of a component of a downlink propagation vector for the downlink channel between the central node and the small cell repeater terminal.

7. The method of claim 1, further comprising:
   transmitting data to the small cell repeater terminal based on the estimated downlink channel.

8. The method of claim 1, further comprising:
   receiving data from the small cell repeater terminal based on the estimated uplink channel.

9. The method of claim 1, further comprising:
   transmitting a first trigger signal to set the small cell repeater terminal into a training mode in which the small cell repeater terminal transmits only uplink pilot signals to the central node on the uplink.

10. The method of claim 9, further comprising:
    transmitting a second trigger signal to the small cell repeater terminal to set the small cell repeater terminal into normal mode and activate access activities by the small cell repeater terminal.

11. A Massive multiple-input-multiple-output (MIMO) central node, comprising: a Massive MIMO antenna array configured to,
    transmit, to a small cell repeater terminal, a downlink pilot signal carrying a set of pilot sequences that are mutually orthogonal in the frequency domain, each pilot sequence in the set of pilot sequences corresponding to an antenna of the Massive MIMO antenna array, and
    receive an uplink pilot signal carrying the set of pilot sequences transmitted by the small cell repeater terminal, the received uplink pilot signal being a frequency converted retransmission of the downlink pilot signal; and
    a measurement extraction circuit configured to estimate at least one of an uplink channel and a downlink channel between the Massive MIMO antenna array and the small cell repeater terminal based on the set of pilot sequences and the received uplink pilot signal.

12. The Massive MIMO central node of claim 11, wherein the measurement extraction circuit is further configured to,
    correlate the received uplink pilot signal with at least one pilot sequence in the set of pilot sequences, and
    estimate the at least one of the uplink channel and the downlink channel based on the correlation.

13. The Massive MIMO central node of claim 12, wherein the Massive MIMO antenna array includes M antennas, where M is a real number greater than or equal to 2, and the measurement extraction circuit is further configured to,
  generate a M×M up/down matrix of correlation values, each correlation value being indicative of a correlation between one of the received uplink pilot signals and a pilot sequence in the set of pilot sequences, and
  estimate the at least one of the uplink channel and the downlink channel based on the M×M up/down matrix.

14. The Massive MIMO central node of claim 13, wherein the measurement extraction circuit is further configured to,
  identify a dominant singular value from among the correlation values in the M×M up/down matrix, and
  estimate at least one of the uplink channel and the downlink channel based on the identified dominant singular value.

15. The Massive MIMO central node of claim 14, wherein singular vectors associated with the dominant singular value are indicative of a relative value of a component of an uplink propagation vector for the uplink channel between the small cell repeater terminal and the Massive MIMO antenna array.

16. The Massive MIMO central node of claim 14, wherein singular vectors associated with the dominant singular value are indicative of a relative value of a component of a downlink propagation vector for the downlink channel between the Massive MIMO antenna array and the small cell repeater terminal.

17. The Massive MIMO central node of claim 11, further comprising: a pre-coding circuit configured to pre-code data for transmission to the small cell repeater terminal based on the estimated downlink channel; and wherein
  the Massive MIMO antenna array is further configured to transmit the pre-coded data to the small cell repeater terminal on the downlink channel.

18. The Massive MIMO central node of claim 11, further comprising:
  a decoding circuit configured to decode data received from the small cell repeater terminal based on the estimated uplink channel.

19. The Massive MIMO central node of claim 11, wherein the Massive MIMO antenna array is further configured to transmit a first trigger signal to set the small cell repeater terminal into a training mode in which the small cell repeater terminal transmits only uplink pilot signals to the Massive MIMO central node on the uplink.

20. The Massive MIMO central node of claim 19, wherein the Massive MIMO antenna array is further configured to transmit a second trigger signal to the small cell repeater terminal to set the small cell repeater terminal into normal mode and activate access activities by the small cell repeater terminal.

21. A small cell repeater terminal for transmitting data through a massive multiple-input-multiple-output (MIMO) backhaul system, the terminal comprising:
  a transceiver antenna configured to,
    receive a trigger signal from a central node of the massive MIMO backhaul system on a downlink channel,
    receive, from the central node, a downlink pilot signal carrying a set of pilot sequences that are mutually orthogonal in the frequency domain, each pilot sequence in the set of pilot sequences corresponding to an antenna of a Massive MIMO antenna array at the Massive MIMO central node, and
    transmit, to the central node, an uplink pilot signal carrying the set of pilot sequences on the uplink; and
  a shifter circuit configured to,
    cause the small cell repeater terminal to enter a training mode in response to the received trigger signal, and
    in the training mode, frequency convert the received downlink pilot signal to generate the uplink pilot signal carrying the set of pilot sequences.

* * * * *